(12) United States Patent
Williamson

(10) Patent No.: US 11,148,734 B1
(45) Date of Patent: Oct. 19, 2021

(54) AIR RIDE FLOOR

(71) Applicant: M & W Cloud Flooring of Texas, LLC, Amarillo, TX (US)

(72) Inventor: Judson Williamson, Canyon, TX (US)

(73) Assignee: M & W Cloud Flooring of Texas, LLC, Amarillo, TX (US)

( * ) Notice: Subject to any disclaimer, the term of this patent is extended or adjusted under 35 U.S.C. 154(b) by 291 days.

(21) Appl. No.: 16/551,558

(22) Filed: Aug. 26, 2019

Related U.S. Application Data

(60) Provisional application No. 62/722,708, filed on Aug. 24, 2018.

(51) Int. Cl.
   *B62D 33/10* (2006.01)
   *B62D 63/06* (2006.01)

(52) U.S. Cl.
   CPC ............. *B62D 33/10* (2013.01); *B62D 63/06* (2013.01)

(58) Field of Classification Search
   CPC ................................ B62D 33/10; B62D 63/06
   USPC ..................................................... 296/193.07
   See application file for complete search history.

(56) References Cited

U.S. PATENT DOCUMENTS

| | | |
|---|---|---|
| 3,549,196 A | 12/1970 | Laney |
| 4,344,656 A | 8/1982 | Masterson, Jr. et al. |
| 4,626,017 A | 12/1986 | Robertson |
| 6,746,190 B2 | 6/2004 | Freeman |
| 6,857,833 B1 | 2/2005 | Rains et al. |
| 8,573,680 B2 * | 11/2013 | Smith ................. B62D 53/068 296/181.5 |
| 2003/0085562 A1 * | 5/2003 | Sparling ................. B60G 5/00 280/789 |
| 2006/0186586 A1 * | 8/2006 | Soles ...................... F16F 9/052 267/64.27 |
| 2010/0096786 A1 * | 4/2010 | Orlamunder ........... F16F 9/057 267/64.27 |
| 2019/0031394 A1 * | 1/2019 | Millhouse ............. B62B 5/0093 |
| 2019/0047343 A1 * | 2/2019 | Naples ................... B60G 11/27 |
| 2019/0249745 A1 * | 8/2019 | Long ...................... B60G 11/27 |
| 2020/0094726 A1 * | 3/2020 | McCluskey ............... B60P 1/43 |

FOREIGN PATENT DOCUMENTS

ES 2360679 6/2011

OTHER PUBLICATIONS

"120-P-25 Firestone Airomatic Data Sheet", https://store.livhaven.com/wa1-358-5677-firestone-industrial-poly-actuator.html (downloaded Aug. 20, 2019).
"120-P-25 Firestone Airomatic Technical Sheet", 37.

* cited by examiner

*Primary Examiner* — Pinel E Romain
(74) *Attorney, Agent, or Firm* — Peacock Law P.C.; Justin R. Jackson

(57) ABSTRACT

An air ride trailer floor and method to provide shock isolation for cargo of a trailer, A plurality of air bags are preferably provided and are attached atop or above a trailer frame and one or more air ride floors are attached to a top of the plurality of air bags such that cargo which rests on the one or more air ride floors receive not only shock isolation from a road surface due to the conventional suspension system of the trailer (if any), but also receive additional shock isolation through the air ride floor. The stiffness of the isolation of the air ride floor can be adjusted by adjusting pressure of gas within the plurality of air bags.

30 Claims, 7 Drawing Sheets

AIR RIDE FLOOR

CROSS-REFERENCE TO RELATED APPLICATIONS

This application claims priority to and the benefit of the filing of U.S. Provisional Patent Application No. 62/722,708, entitled "Air Ride Floor," filed on Aug. 24, 2018, and the specification thereof is incorporated herein by reference.

BACKGROUND OF THE INVENTION

Field of the Invention (Technical Field)

Embodiments of the present invention relate to an above-frame air ride cushioning system, which can be trailer mounted and can include a plurality of air bags on top of the frame or on top of a floor of the trailer for transporting cargo, which cargo can include animals or other precious cargo. In one embodiment, the trailer can be arranged with a plurality of air bags on top of the frame or on top of a floor. A floor, bed, or other supporting structure is placed on top of air bags, which provides a smoother ride for cargo and which can reduce stress and fatigue for animals traveling thereon.

Typical trailers rely on leaf springs, torsion axles, or air shocks disposed so as to provide shock absorption for the entire trailer. This is done by mounting such structures between the axle(s) of the trailer and the frame of the trailer. The floor of the trailer is then directly connected to the frame. While such a configuration can often provide adequate shock absorption for a particular load of cargo, it is often desirable for cargo to receive further shock isolation from the movement of the axle(s) of the trailer. While other systems have been configured to provide further shock isolation for cargo, including rubber mats and shock-absorbing packaging in product shipping containers, those known systems are cumbersome and difficult or impossible to adjust. There is thus a present need for an air ride floor that is preferably in addition to and independently operable from the primary suspension of the trailer.

BRIEF SUMMARY OF EMBODIMENTS OF THE PRESENT INVENTION

An embodiment of the present invention relates to an air ride trailer that includes at least one axle, a frame, a plurality of air bags, which can optionally include at least three air bags, the plurality of air bags disposed above the frame and not disposed below the frame. The first air ride floor can be disposed above and/or attached to a top of the plurality of air bags. In one embodiment, the first air ride floor can be connected to the frame of the trailer through the plurality of air bags. The first air ride floor is preferably movably positionable with respect to the frame. The air ride trailer can also include a compressed gas source, which can optionally include an air compressor. The air ride trailer can also include a pressure control station and at least one gas line that preferably connects the pressure control station to the plurality air bags. The pressure control station can be communicably coupled to the compressed gas source and the plurality air bags. The air ride trailer can also include a plurality of gas supply lines coupled to a respective one or more of the plurality air bags such that at least two response characteristics zones are formed. The air ride trailer can also include a second air ride floor and the plurality air bags can include a first set of at least three air bags and a second set of at least three air bags. The first air ride floor can be attached to a top of the first set of at least three air bags and the second air ride floor can be attached to a top of the second set of at least three air bags. The supply lines can be respectively coupled to the first set of at least three air bags and the second set of at least three air bags such that the second air ride floor is independent from the first air ride floor.

In one embodiment, the air ride floor is not connected to the frame of the trailer except through the plurality air bags. The plurality air bags can be positioned such that when pressurized gas is forced into the air bags, the first air ride floor is lifted upward away from the frame. The air ride trailer can also include a suspension system configured to provide suspension between the frame and the at least one axle. The plurality air bags are preferably positioned such that adjustments made to gas pressure within the plurality air bags do not result in adjustments in the suspension system. Optionally, the plurality of air bags can include 3, 4, 8, 16, 24, or more air bags.

Embodiments of the present invention also relate to a method for providing shock isolation for trailer cargo including mounting a plurality of air bags on or above one or more frame members of a trailer, disposing and/or attaching an air ride floor on or above the plurality of air bags, connecting one or more supply lines to the plurality of air bags, and providing a supply of compressed gas to the plurality of air bags. Optionally, mounting a plurality of air bags on or above one or more frame members of a trailer can include bolting the plurality of air bags to the one or more frame members and/or attaching the plurality of air bags to a bed of the trailer.

Providing a supply of compressed gas can include providing an air compressor. The method can also include providing a pressure control station, which can include connecting the pressure control station to the supply of compressed gas and connecting the pressure control station to the one or more supply lines. Optionally, connecting one or more supply lines can include providing at least two supply lines and connecting the at least two supply lines to the plurality of air bags such that at least two response characteristic zones are created. In one embodiment, attaching an air ride floor can include attaching at least two air ride floors and each of the at least two air ride floors can be respectively attached to air bags of at least two response characteristic zones such that response characteristics of the at least two air ride floors are independently adjustable with respect to one another. Optionally, disposing and/or attaching an air ride floor on or above the plurality of air bags can include communicably coupling the air ride floor to the plurality of air bags Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Embodiments of the present invention relate to a trailer provided with a plurality of air bags on top of the frame or on top of a floor of the trailer for transporting any type of cargo, including but not limited to stock, show, race, or other performance animals, and/or any type of goods or other materials. The term "air bags" is intended to include conventional air shocks, air bags, pneumatic cylinders, pneumatic actuators, air springs, polyactuators, or any other structure which is configured to expand or extend when a pressurized gas, or pressurized mixture of gases, is inserted therein. In one embodiment, Airomatic® brand polyactuators are preferably used as air bags. (Airomatic® is a registered trademark of Firestone Industrial Products Company, LLC). Embodiments of the present invention can be specifically applicable to trailers that are designed for the comfort and/or safety of the animals being transported, or for goods that might benefit from a suspension system leading to less stress on the goods being transported. Thus, embodiments of the present invention provide a suspension system mounted between the frame of a trailer and the floor of a trailer, and provide a smoother ride and less stress on the animals or goods being transported.

Figure 1:
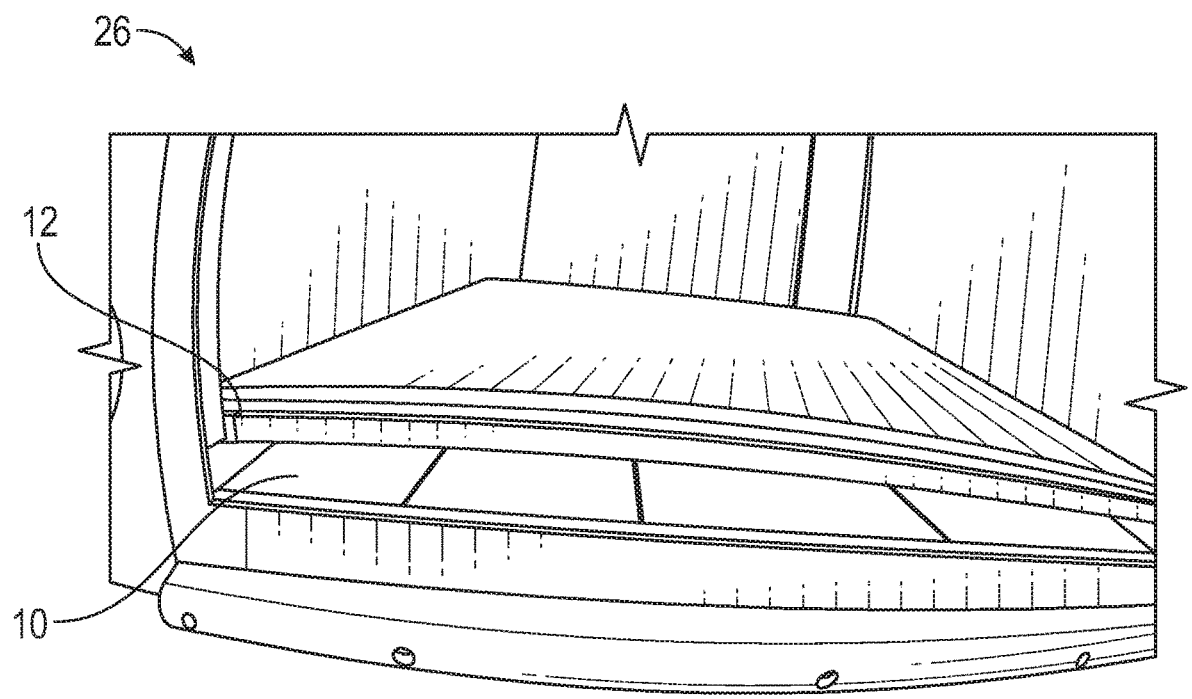
FIG. 1 is a drawing which illustrates a rear-view of an enclosed livestock trailer with an existing trailer floor, wherein an air ride floor, according to an embodiment of the present invention, has been added as a retrofit to the existing conventional trailer.

FIG. 1 illustrates trailer 26 with existing or typical trailer floor 10, and air ride floor 12 according to one embodiment of the present invention. In this embodiment, trailer 26 is provided with air ride floor 12 separated from existing trailer floor 10 by air bags 14 (see FIG. 2) that are disposed under air ride floor 12.

Figure 2:
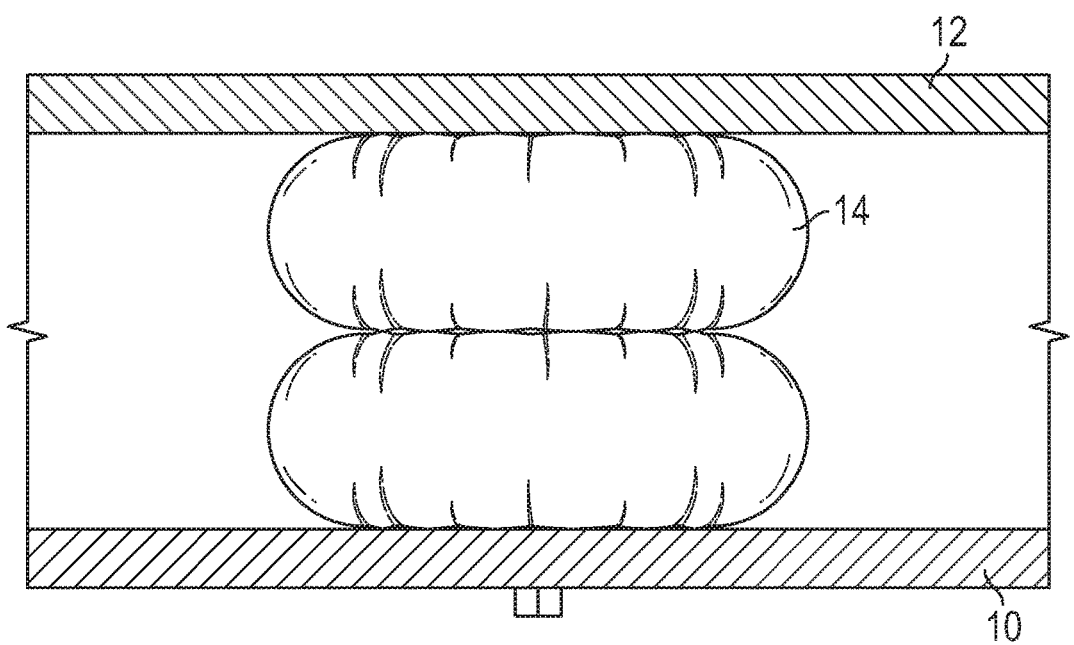
FIG. 2 is a drawing which illustrates a close-up side view of an air bag mounted on top of a trailer frame and of an air ride floor mounted on top of the air bag according to an embodiment of the present invention.

FIG. 2 illustrates air bag 14 disposed between existing trailer floor 10, and air ride floor 12, according to one embodiment of the present invention. As can be seen in the figure, a suspension gap is provided between existing floor 10 and air ride floor 12. Air ride floor 12 is thus isolated from existing floor 10 via air bags 14. In one embodiment of the present invention, an opening can be made in existing trailer floor 10 into which can be installed air bags 14, such that air bags 14 can be copied to frame 24 (see FIG. 3) of trailer 26. Air ride floor 12 can then be coupled to the top of air bags 14. In one embodiment of the present invention, the number of air bags 14 can be as many as are desired, depending on the area and adjustment desired by a particular user. Preferably three (3) or more air bags 14 are provided for a single trailer.

Figure 3:
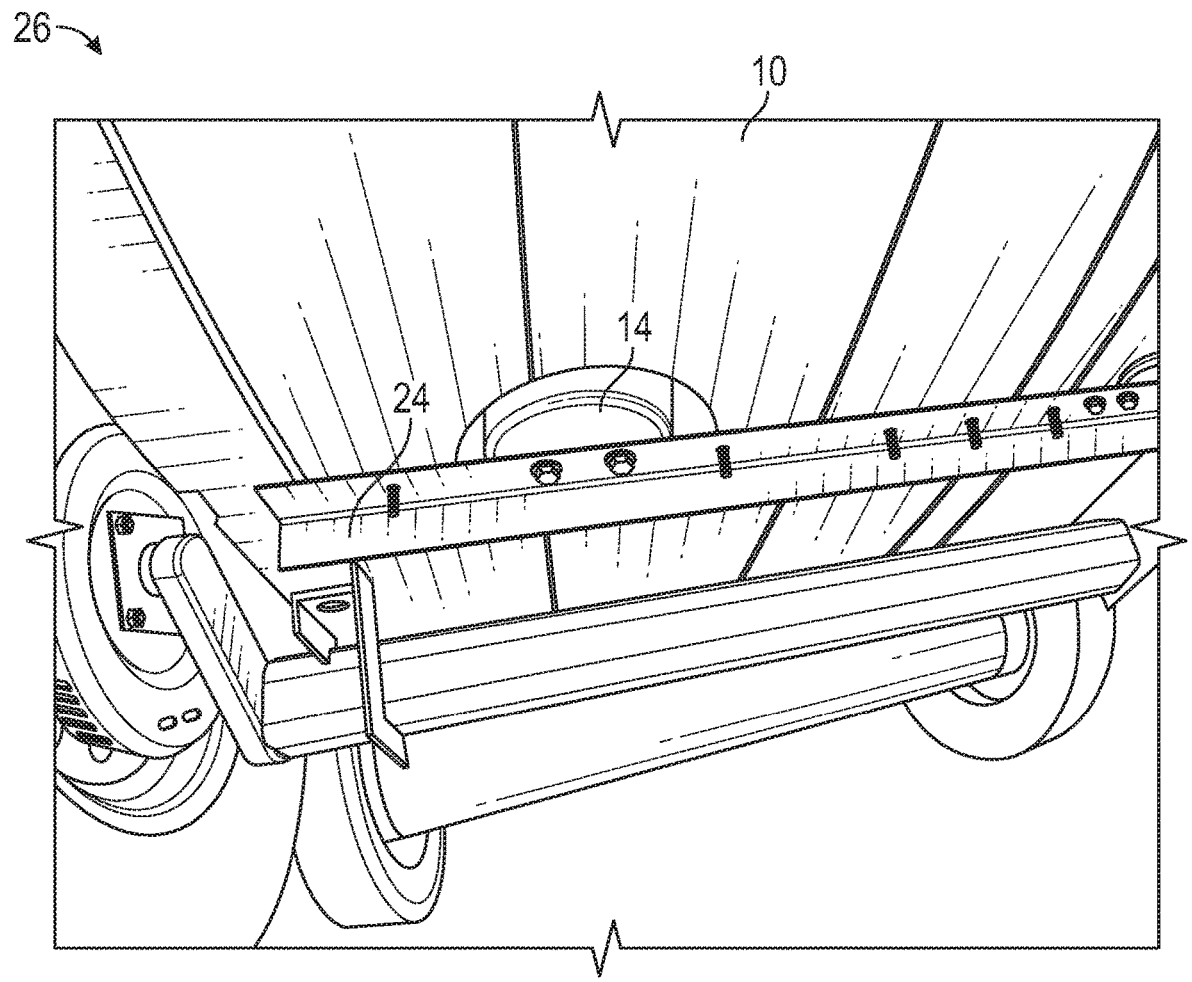
FIG. 3 is a drawing of an underside of the trailer that has been retro-fitted to provide an air ride floor above the original trailer floor by cutting holes in the original floor and attaching the air bags to the frame of the trailer.

In the underside view of a trailer that has been retrofitted with an air ride floor, as illustrated in FIG. 3, air bags 14 are coupled to frame 24 of the trailer through holes cut in existing trailer floor 10 to allow easy coupling of air bags 14 directly to the top of a member of frame 24.

Figure 4:
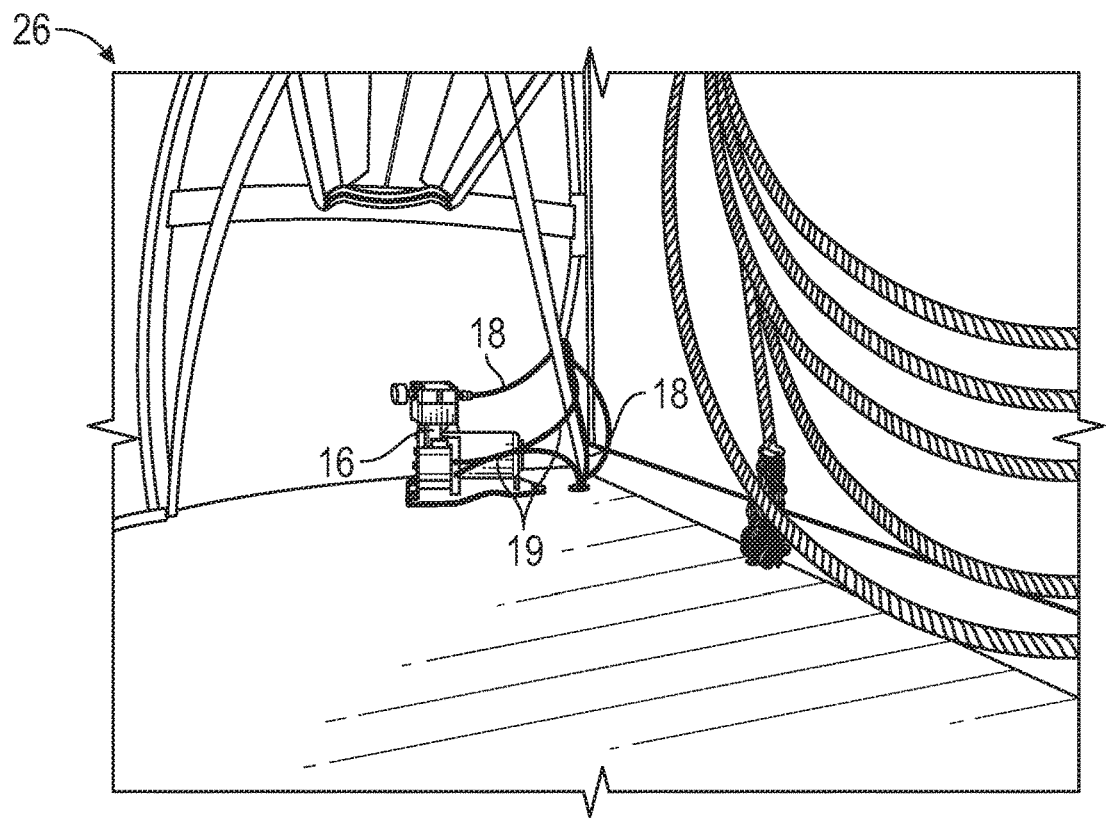
FIG. 4 is a drawing which illustrates an air compressor mounted in a trailer with an air hose and electrical wires connected thereto.

FIG. 4 illustrates air compressor 16 with hoses 18 and electrical wiring 19. In one embodiment, air compressor 16 can be located inside on the floor of trailer 26. However, air compressor 16 can be positioned anywhere on or around trailer 26. Although air compressor 16 can provide desirable results, in one embodiment, another source of compressed and/or liquified gas, including but not limited to a cylinder of liquid or gaseous carbon dioxide, nitrogen, compressed air, or any other source of compressed gas or gas mixture can be used and will provide desirable results. Such other source of compressed and/or liquified gas can be used in addition to or in place of air compressor 16. Optionally, air compressor 16 can be configured to charge an air tank such that a supply of stored compressed air is available even when air compressor 16 is inactive. One or more hoses 18 can be routed from air compressor 16 and/or a container of compressed gas in any location as is convenient or desirable for a particular trailer. Hoses 18 can be covered as a unitary bunch with an appropriate covering and/or can be routed individually or as a group, for example through conduit or sheathing, thus protecting them from damage. In one embodiment, air compressor 16 can comprise a remote-controlled air compressor, which can optionally be controlled via a wireless connection to a smart phone such that the air compressor can be adjusted remotely by a user with his or her smart phone and/or such that the air compressor can be controlled automatically by an application on the users phone.

Figure 5:
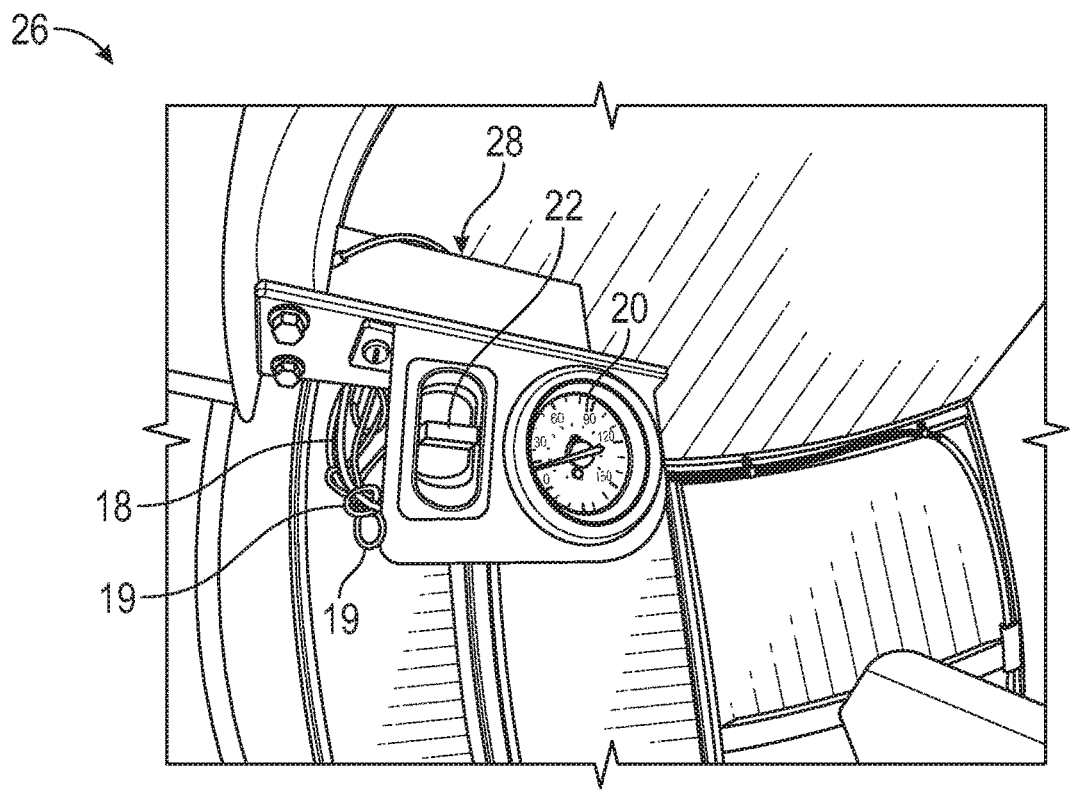
FIG. 5 is a drawing which illustrates a single gauge pressure control panel for an air ride floor, which pressure control panel is mounted on a trailer according to an embodiment of the present invention.

Referring to FIG. 5, to permit operator control and adjustment of pressure within air bags 14 (not shown), pressure control station 28 is preferably provided and can include pressure gauge 20, and pressure adjustment switch 22. Optionally, pressure adjustment switch 22 can comprise one or more valves and/or an electrical switch, which itself can be communicably coupled to one or more solenoids. Pressure adjustment switch 22 is preferably configured to send more compressed gas into one or more air bags 14 and/or to reduce the pressure of the compressed gas, for example by venting some of the gas. Electrical and mechanical connection is preferably configured via one or more hoses 18 and electrical wiring 19 which preferably couple pressure control station 28 to air compressor 16 (not shown). Optionally, pressure control station 28 can comprise a pressure regulator which maintains a set pressure in one or more air bags 14.

As best illustrated in FIG. 5, pressure control station 28 can be positioned anywhere inside or outside of trailer 26, or at another location accessible to a user. For example, in one embodiment, pressure control station 28 can be disposed on a vehicle that is coupled to trailer 26. For embodiments that are disposed on a trailer having living quarters, in one embodiment, pressure control station 28 can be disposed in the living quarters.

Figure 6:
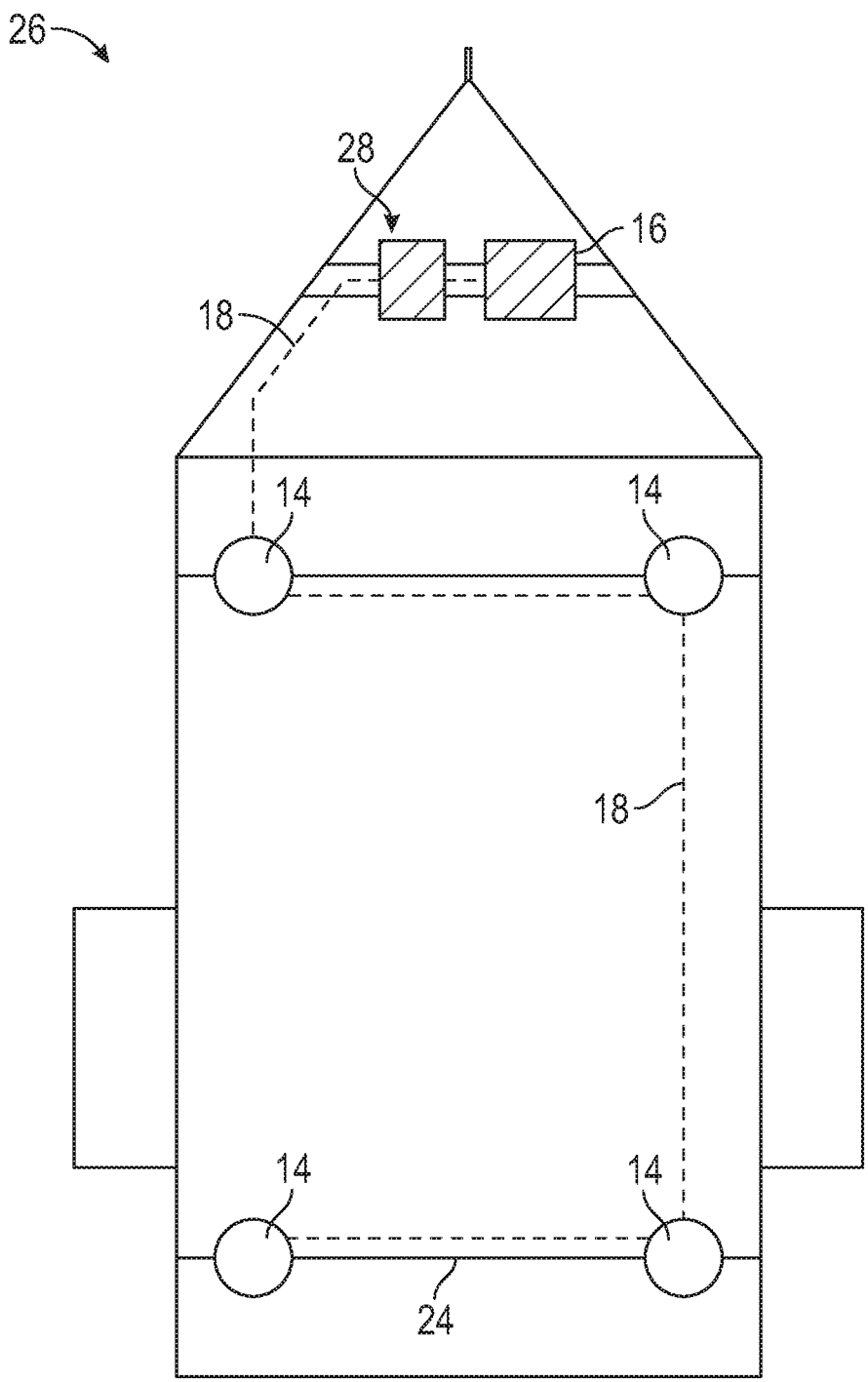
FIG. 6 is a drawing which illustrates a top view of a trailer with an air ride floor removed so that the placement of the air bags can be observed, and wherein all air bags are connected such that they all share the same pressure.
Figure 7:
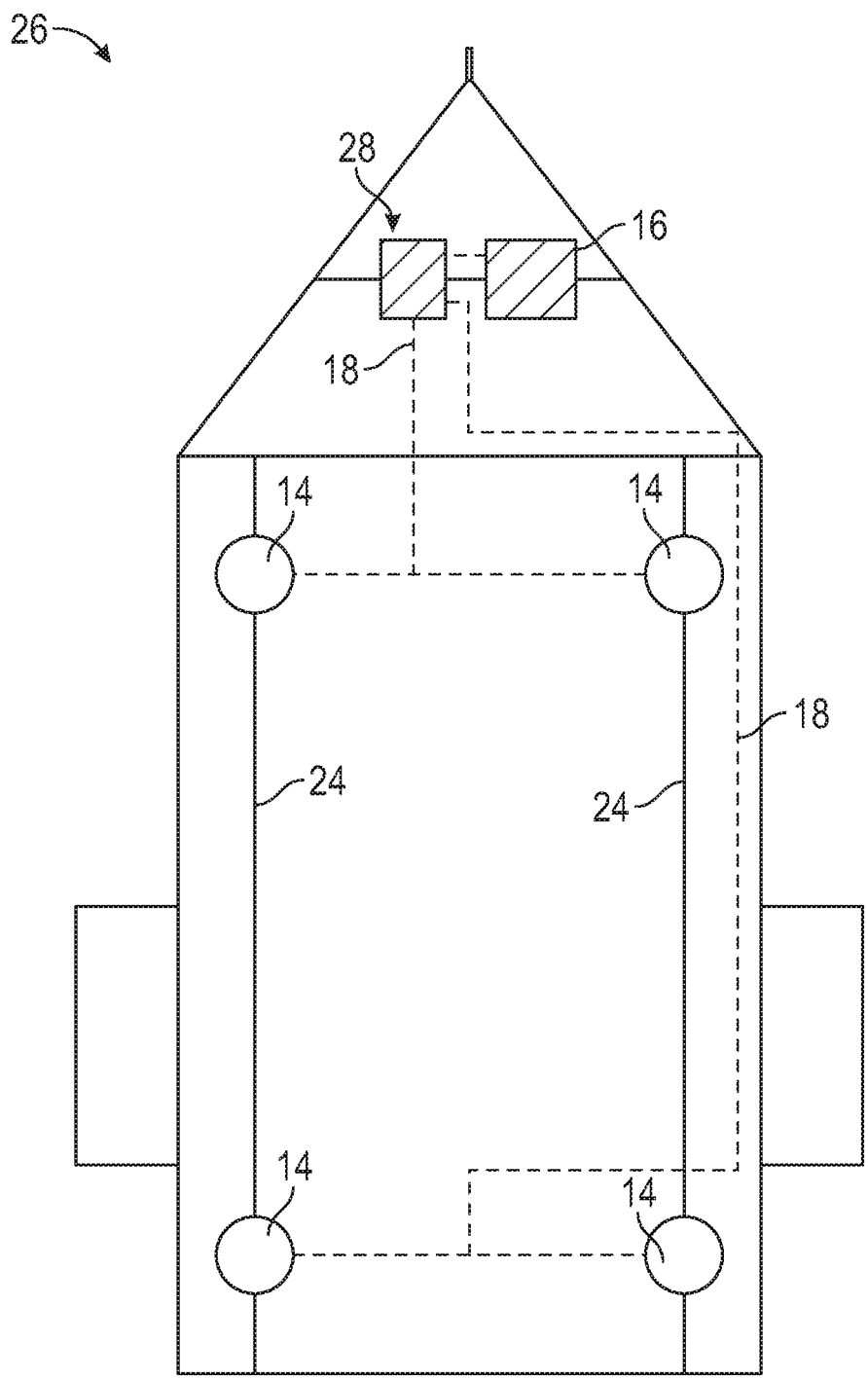
FIG. 7 is a drawing which illustrates a top view of a trailer with an air ride floor removed so that the placement of the air bags can be observed, and wherein the front air bags are connected together separately from the rear air bags.

Depending on a desired configuration and control structure, in one embodiment, pressure control station 28 can comprise a plurality of pressure gauges 20, adjustment switches 22, and/or regulators. In this manner, a plurality of different response characteristic zones can be created on trailer 26. For example, in one embodiment, as best illustrated in FIG. 6 (note: floor 12 is removed in FIG. 6 so that that air bags 14 and air lines 18 can be observed), a single response characteristic zone can be created such that all air bags 14 are provided the same pressure and thus provide the same shock absorbing characteristics over the entirety of air ride floor 12 (assuming of course that each of the four air bags illustrated are of the same size). Alternatively, however, as best illustrated in FIG. 7, some air bags 14 can optionally be controlled independently from other air bags 14. FIG. 7, which also has the air ride floor removed for illustrative purposes, illustrates an embodiment wherein the front two air bags are connected independently from the rear two air bags such that they can be controlled independently of the rear two air bags. Thus, in FIG. 7, trailer 26 is provided with two different response characteristics zones—a front zone and a rear zone. In this embodiment, pressure control station 28 preferably comprises a pair of pressure switches 22 and gauges 20 such that the front zone can be controlled and monitored independently of the rear zone.

Figure 8:
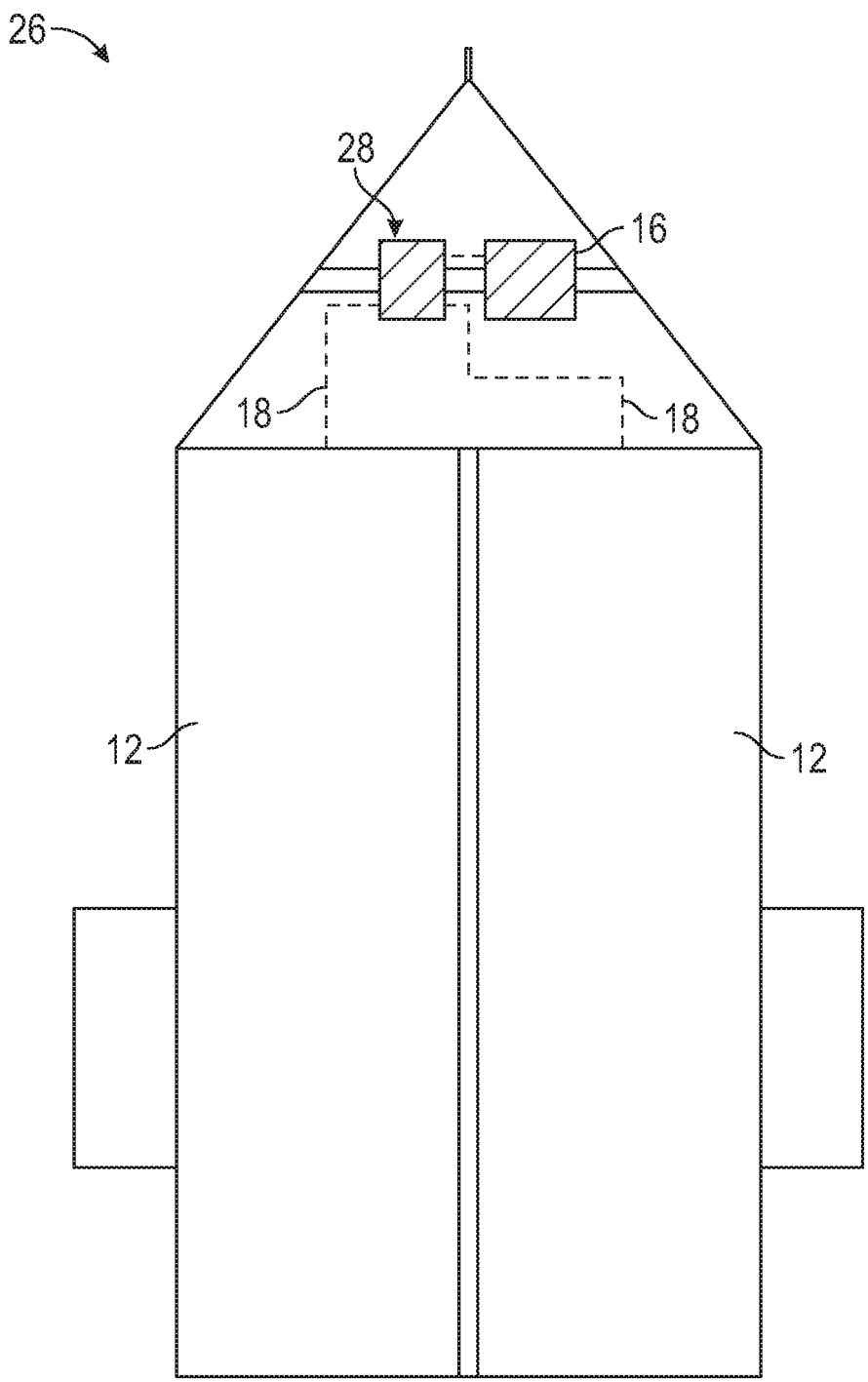
FIG. 8 is a drawing which illustrates a top view of a trailer having two air ride floors which are independently adjustable with respect to one another.

Although desirable results can be provided with embodiments wherein a single air ride floor 12 is provided, including a single air ride floor 12 having a ride characteristic zone at one side thereof and a different ride characteristic zone at another side, e.g., a firm ride at the front and a soft, or more forgiving, ride characteristic zone at the rear. In one embodiment, a plurality of air ride floors 12 can be provided on a single trailer. For example, as is best illustrated in FIG. 8, two separate air ride floors 12 can be provided on a single trailer. Most preferably, each of the two separate air ride floors 12 are coupled to air bags 14 that can be operated independently from the air bags of the other air ride floor. Thus, a plurality of different ride characteristic zones can be provided and each zone can be isolated from another zone by providing separate ride floors for each zone.

In one embodiment, air bags 14 are attached above a frame and below an air ride floor, and conventional leaf springs, air shocks, and/or a torsion axle can be disposed between the frame and the axle of the trailer. In one embodiment, the air ride floor is a suspension system that is independently adjustable from the conventional trailer suspension. In one embodiment, air bags 14 are not disposed below the frame of the trailer. In one embodiment, air bags 14 are not attached to an axle of a vehicle. In one embodiment, the entire floor of the trailer is an air ride floor and is suspended above the frame of the trailer with air bags 14. In one embodiment, the only connection of the air ride floor to the frame of the trailer is through air bags 14. In one embodiment, no portion of a floor of the trailer is directly coupled to the frame of the trailer. In one embodiment, the air ride floor does not rely on a hinge or pivot mechanism to function. In one embodiment, the air compressor or other compressed gas supply for air bags 14 is disposed on the trailer.

Figure 9:
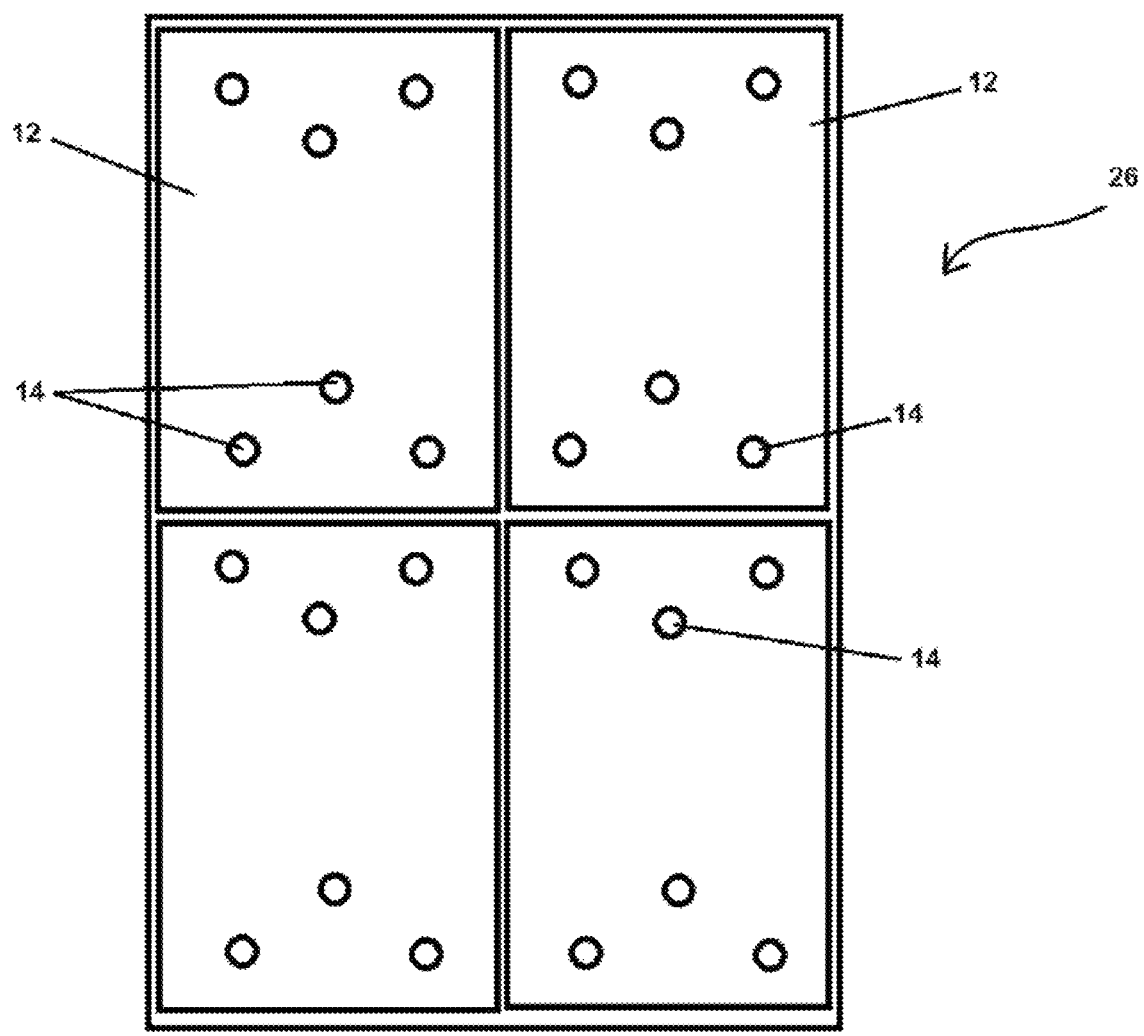
FIG. 9 is a drawing which schematically illustrates a trailer with four air ride floors, each with six air bags.

Referring now to FIG. 9, in one embodiment, any desired number of air bags 14 can be provided in any desired location on each of air ride floors 12 of trailer 26. As with other embodiments, the front three air bags of each floor 12 in FIG. 9 can be grouped in individual zones and the rear three air bags of each floor 12 can be grouped in other individual zones. Thus, in the embodiment illustrated in FIG. 9, eight zones can be provided. Alternatively, each of the three front air bags of each floor 12 can be grouped together and each of the three rear air bags of each floor 12 can be grouped together such that two zones are provided for trailer 26 of FIG. 9. Alternatively, all six air bags of each floor 12 can be grouped together such that each floor 12 is connected as a single zone that is independent from the other floors. Of course, any other arrangement of groupings of air bags 12 can be made to provide any desired number and arrangement of individual zones.

Because desirable results can be obtained when multiple air bags are used on a single air ride floor 12 and because numerous air ride floors 12 can be provided in a single trailer 26, to illustrate one application of an embodiment of the present invention, a large horse trailer can haul 10 horses simultaneously and each of those 10 horses can be placed on separate air ride floors 12. Each air ride floor can optionally have 6 or more air bags. In one embodiment, 60 air bags can be provided on a single trailer. Thus, in one embodiment, three or more air bags can be used on a single trailer, 20 or more air bags can be used on a single trailer, 40 or more air bags can be used on a single trailer, or 60 or more air bags can be used on a single trailer.

Note that in the specification and claims, "about" or "approximately" means within twenty percent (20%) of the numerical amount cited.

Although the invention has been described in detail with particular reference to the disclosed embodiments, other embodiments can achieve the same results. Variations and modifications of the present invention will be obvious to those skilled in the art and the appended claims are intended to cover all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. An air ride trailer comprising:
   at least one axle;
   a frame;
   a plurality of air bags, said plurality of air bags disposed above said frame and not disposed below said frame; and
   a first air ride floor disposed above a top of said plurality of bags such that said first air ride floor is movably positionable with respect to said frame.

2. The air ride trailer of claim 1 further comprising a compressed gas source.

3. The air ride trailer of claim 2 wherein said compressed gas source comprises an air compressor.

4. The air ride trailer of claim 2 further comprising a pressure control station.

5. The air ride trailer of claim 4 further comprising at least one gas line connecting said pressure control station to said at least three air bags.

6. The air ride trailer of claim 4 wherein said pressure control station is communicably coupled to said compressed gas source and said plurality of air bags.

7. The air ride trailer of claim 6 wherein said air ride trailer further comprises a plurality of gas supply lines coupled to a respective one or more of said plurality of air bags such that at least two response characteristics zones are formed.

8. The air ride trailer of claim 6 further comprising a second air ride floor and wherein said plurality of air bags comprise a first set of at least three air bags and a second set of at least three air bags, said first air ride floor attached to a top of said first set of at least three air bags and said second air ride floor attached to a top of said second set of at least three air bags and wherein supply lines are respectively coupled to said first set of at least three air bags and said second set of at least three air bags such that said second air ride floor can be moved independently from said first air ride floor.

9. The air ride trailer of claim 1 wherein said first air ride floor is not connected to said frame of said trailer except through said plurality of air bags.

10. The air ride trailer of claim 1 wherein said plurality of air bags are positioned such that when pressurized gas is forced into said air bags, said first air ride floor is lifted upward away from said frame.

11. The air ride trailer of claim 1 comprising a suspension system configured to provide suspension between said frame and said at least one axle.

12. The air ride trailer of claim 11 wherein said plurality of air bags are positioned such that adjustments made to gas pressure within said plurality of air bags does not result in adjustments in said suspension system.

13. The air ride trailer of claim 1 wherein said first air ride floor is connected to said frame of said trailer through said plurality of air bags and such that said first air ride floor is movably positionable with respect to said frame.

14. The air ride trailer of claim 1 wherein said plurality of air bags comprises at least four air bags.

15. The air ride trailer of claim 1 wherein said plurality of air bags comprises at least eight air bags.

16. The air ride trailer of claim 1 wherein said plurality of air bags comprises at least 16 air bags.

17. The air ride trailer of claim 1 wherein said plurality of air bags comprises at least 24 air bags.

18. A method for providing shock isolation for trailer cargo comprising:
    mounting a plurality of air bags on or above one or more frame members of a trailer;
    disposing an air ride floor on or above the plurality of air bags;
    connecting one or more supply lines to the plurality of air bags; and
    providing a supply of compressed gas to the plurality of air bags.

19. The method of claim 18 wherein mounting a plurality of air bags on or above one or more frame members of a trailer comprises bolting the plurality of air bags to the one or more frame members.

20. The method of claim 18 wherein mounting a plurality of air bags on or above one or more frame members of a trailer comprises attaching the plurality of air bags to a bed of the trailer.

21. The method of claim 18 wherein providing a supply of compressed gas comprises providing an air compressor.

22. The method of claim 18 further comprises providing a pressure control station.

23. The method of claim 22 wherein providing a pressure control station comprises connecting the pressure control station to the supply of compressed gas and connecting the pressure control station to the one or more supply lines.

24. The method of claim 18 wherein connecting one or more supply lines comprises providing at least two supply lines and connecting the at least two supply lines to the plurality of air bags such that at least two response characteristic zones are created.

25. The method of claim 24 wherein attaching an air ride floor comprises attaching at least two air ride floors and wherein each of the at least two air ride floors are respectively attached to air bags of at least two response characteristics zones such that response characteristics of the at least two air ride floors are independently adjustable with respect to one another.

26. The method of claim 18 wherein disposing an air ride floor on or above the plurality of air bags comprises communicably coupling the air ride floor to the plurality of air bags.

27. The method of claim 18 wherein mounting a plurality of air bags on or above one or more frame members of a trailer comprises mounting at least four air bags on or above one or more frame members of a trailer.

28. The method of claim 18 wherein mounting a plurality of air bags on or above one or more frame members of a trailer comprises mounting at least eight air bags on or above one or more frame members of a trailer.

29. The method of claim 18 wherein mounting a plurality of air bags on or above one or more frame members of a trailer comprises mounting at least 16 air bags on or above one or more frame members of a trailer.

30. The method of claim 18 wherein mounting a plurality of air bags on or above one or more frame members of a trailer comprises mounting at least 24 air bags on or above one or more frame members of a trailer.

\* \* \* \* \*